United States Patent [19]

Ciccarelli et al.

[11] Patent Number: 5,053,093
[45] Date of Patent: Oct. 1, 1991

[54] PROCESS FOR PRODUCING SLIDING BODIES CONTAINING HOLLOW CHAMBERS

[75] Inventors: Mario Ciccarelli; Heinrich Schelter, both of Selb, Fed. Rep. of Germany

[73] Assignee: Hoechst CeramTec Aktiengesellschaft, Selb, Fed. Rep. of Germany

[21] Appl. No.: 329,848

[22] Filed: Mar. 28, 1989

[30] Foreign Application Priority Data

Mar. 30, 1988 [DE] Fed. Rep. of Germany ....... 3810820

[51] Int. Cl.⁵ .................. F16J 15/34; B32B 18/00
[52] U.S. Cl. ........................ 156/89; 264/59;
   277/1; 277/2; 277/70; 277/75; 277/80; 277/81
   R; 277/81 S; 277/96.1; 277/96.2; 277/96.2;
   277/201; 277/233
[58] Field of Search ............... 156/89; 264/59; 277/1,
   277/2, 70, 75, 80, 81 R, 81 S, 96.1, 96.2, 201,
   233, DIG. 6

[56] References Cited

U.S. PATENT DOCUMENTS

| 3,725,186 | 4/1973 | Lynch | 156/89 |
| 3,870,776 | 3/1975 | McMahon | 264/61 |
| 4,714,257 | 12/1987 | Heinrich et al. | 277/1 |
| 4,806,295 | 2/1989 | Trickett et al. | 264/59 |

FOREIGN PATENT DOCUMENTS 0092716 11/1983 European Pat. Off. .
2357625 7/1974 Fed. Rep. of Germany .

*Primary Examiner*—Caleb Weston
*Attorney, Agent, or Firm*—Foley & Lardner

[57] ABSTRACT

In a process for producing ceramic sliding bodies containing hollow chambers from a green solid parent body and a green film body containing hollow chambers, the green film body and the green solid parent body are laminated together, the organic constituents are removed by heating from the green body so obtained or the organic constituents are carbonized. Subsequently, the body is fired or siliconized. According to the invention, the green solid parent body is produced from the ceramic green material of the film body, in particular from film residues which are produced in producing the green film body containing hollow chambers. The film residues may be comminuted to form a powder in a mill.

16 Claims, 1 Drawing Sheet

PROCESS FOR PRODUCING SLIDING BODIES CONTAINING HOLLOW CHAMBERS

BACKGROUND OF THE INVENTION

The invention relates to a process for producing a sliding body of a ceramic material, in particular of Si/SiC, for sliding systems, in particular for slip-ring seals.

Axial and radial slip-ring seals are used, as a rule, to seal rotating machine parts against liquid or gaseous media and generally have a stationary and a rotating slip ring which are pressed against each other by a spring element. The slip rings form a sealing gap in which the slip ring surfaces are arranged opposite each other. When the seal is in operation, the sealing gap contains a liquid sealing agent in which there is a drop in pressure. For difficult sealing cases, for example in machines in which there is a very high or very low internal pressure, use may be made, for example, of axial slip-ring seals which ensure a hydrostatic and hydrodynamic seal and at the same time relieve the slip-ring seal of load. This is achieved by introducing so-called hydrodynamizing recesses into the slip ring (German Auslegeschrift 1,475,621 and DE-B 2,928,504). At high pressures and temperatures, particular measures are necessary to cool the slip rings. In this connection it is known to provide coolant channels in the slip-ring bodies through which a coolant flows (CH-B 413,522). In the case of ceramic slip-ring seals, in particular, it is very difficult and expensive and only possible with considerable complexity to introduce both hydrodynamizing recesses and also coolant channels. It has been possible to solve this problem by constructing the ceramic slip ring with complicated internal structures composed of individual so-called "green films" into which the required channels, holes, recesses etc., have already been introduced, for example, by punching out and then firing the laminated slip ring in a known manner to produce compact bodies. Such a process is described, for example, in EP-A-0,092,716. However, this process has disadvantages, in particular if a sliding body is assembled from a solid parent body and a part produced by "film technique" and is fired to form a finished body. At the lamination point between the solid parent body and "film body", a weak point at which the sliding body may break apart during subsequent use or, if SiC is used, even during siliconizing, is produced owing to the non-ideal sintering together of the two parts. This is apparently attributable to the fact that the ceramic compounds for the two parts are prepared in different ways and that, for example, the proportion of organic constituents in the film body is greater than in the solid parent body which is generally dry-pressed.

SUMMARY OF THE INVENTION

It is the object of the invention to produce sliding bodies with complicated internal structure from a solid parent body and a film body, in which the laminating point between said two bodies is so good that the sliding body does not break at said point either during siliconizing or in operation, which substantially increases the component reliability.

This object is achieved by a process for producing ceramic sliding bodies containing hollow chambers from a green solid parent body and a green film body containing hollow chambers, in which process the green film body and the green solid parent body are laminated together, the organic constituents are removed from the green body so obtained by heating or the organic constituents are carbonized, and the body is then fired or siliconized, which process comprises producing the green body from the ceramic green material of the foil body.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing by which

DETAILED DESCRIPTION OF THE PREFERRED EMBODIMENTS

Figure 1:
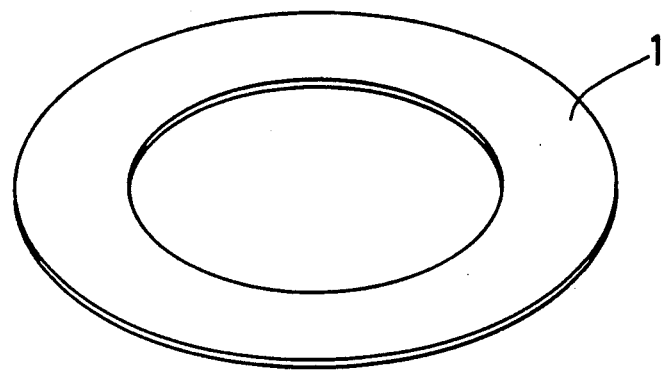
FIG. 1 depicts a ring of green film material used to form part of the green film body according to the invention.

A ceramic sliding body containing hollow chambers is understood to mean sliding bodies, in particular slip rings, whose interior contains hollow chambers, as a result of which hydrodynamic recesses are produced on the sliding surface during operation or holes, concentric chambers or the like are situated in the interior thereof. Slip rings with such a complicated internal structure are described, for example, in EP-A-0,092,716. Possible ceramic materials are, for example, silicon-infiltrated silcon carbide (Si/SiC), aluminum oxide, glass ceramic, hard materials such as tungsten carbide, hard metals, sintered metals or graphite, in particular silicon-infiltrated silicon carbide. Particularly advantageous for film bodies are ceramic films which are described, for example, in German Auslegeschrift 2,357,625, U.S. patent specification No. 3,870,776 or EP-A-0,036,435.

The production of complicated shaped moldings, in particular film bodies in the form of slip rings, is described, for example, in EP-A-0,092,716. In this case, the green films are produced by generally known methods by casting a slip on a strip. The slip is composed of suitable ceramic powders which are mixed with organic binders, dispersants and diluents and optionally plasticizers and aids such as oils. The predried green films are cut and the required shapes, for example, rings are punched out of the cards produced. Then the necessary holes, ring segments or any other recesses can be punched out or embossed in these punched-out shapes.

The punched-out or embossed films are then assembled to form a sliding body, the individual layers being laminated together with the aid of a laminating press. In the laminating operation, use is made of a pressing device. The ram pressure used depends on the organic content and the nature of the laminating aids. For the laminating operation, use is made either of a ceramic paste which preferably contains a ceramic filler or of purely organic adhesives which are applied by screen ting aid results in a plurality of advantages such as making possible low pressures in the laminating operation which avoids deformation of the hollow chambers. In addition, the corrugation of the films is smoothed out.

The solid green parent body, which subsequently yields, together with the film body, the finished green sliding body, is now produced, according to the invention, from the same ceramic green material from which the film body is also produced, i.e. the slip for the green solid parent body has the same composition as the slip for the film and is also predried under identical conditions. In particular, the organic constituents of the film compounds and of the compounds used for the green solid parent body should be virtually identical chemically and in terms of quantities.

It was quite unexpected that the green solid parent bodies can be pressed from this film material since the person skilled in the art was compelled to assume that the proportion of organic constituents in the film compounds is too large to press solid parent bodies from it. Normally, the organic proportion has to be lower, for example, in dry pressing.

The process according to the invention is therefore particularly economic because it is possible to make use of film residues which are produced in punching out the various shapes from the green films which are used to construct the film bodies containing hollow chambers.

These film residues are ground, for example, in a breaker mill and screened to particle sizes of 40-400 μm. The powder is then converted to the shape of a green solid parent body, for example a slip ring, in a press, for example a dry press, or by isostatic pressing. Preferably, the powder is dry pressed at pressures of 1500 to 2000 bar, preferably 1600 to 1800 bar, the ram pressure being so chosen in this range that the "green density" of the solid parent body corresponds to the "green density" of the film material.

If necessary, the parent body so obtained may be post-treated, for example by turning, milling, drilling or sawing to produce the required external contour. The film body is now laminated onto the green solid parent body so obtained. Depending on the requirement, this can be done in various ways. Thus, the film body may first be built up as such and then laminated as a whole onto the parent body or two film bodies are separately built up and then laminated onto the parent body, for example from below and from above. A further possibility is to build up the film body by laminating individual films onto the parent body. This lamination onto the parent body can also be carried out from above and from below. The individual films or the film body or bodies are laminated onto the solid parent body with the aid of a laminating press, ceramic pastes being used together with organic adhesives, or even organic adhesives alone being used as laminating aids. Such pastes are described, for example, in EP-A-0,092,716.

The organic constituents are subsequently removed by heating to an amount of 40-60% of the plastic component and this produces an additional initial strength of the sliding body built up from film body and solid parent body. This achieves the result that the "semi-green" sliding body can be machined well. The remaining organic constituents are then removed by heating and the sliding body is sintered or siliconized between 1200° and 2200° C. A further post-machining in the form of grinding, lapping and/or polishing may be necessary.

The fired sliding bodies produced according to the invention are characterized by a thickness of the lamination point between film body and solid parent body of 10-100 μm, preferably of 10-50 μm, and virtually identical, preferably identical particle sizes and particle size distribution (particle size spectrum) of the ceramic material in the film body and in the solid parent body.

Since both the film body and also the solid parent body are built up from the same green material and have identical "green densities" and, as a consequence thereof, identical shrinkage, the assembled—and sintered together—sliding body behaves in a completely homogeneous manner, i.e. stresses which have an unfavorable effect on component reliability no longer occur, in particular, at the critical lamination point between film body and solid parent body.

The process according to the invention is now explained by reference to an exemplary embodiment.

EXAMPLE

Production of a slip ring from infiltrated SiC

To produce the ceramic casting slip,

90% by weight of SiC powder (particle size range: 1-90 μm) and

10% by weight of graphite powder (specific surface: 15-25 m$^2$/g)

100% by weight of solid ceramic compound are mixed with (the following figures in % by weight are based on 100% by weight of solid ceramic compound)

24% by weight of ethanol

10% by weight of toluene

1% by weight of menhaden oil

8% by weight of polyvinylbutyral

Figure 2:
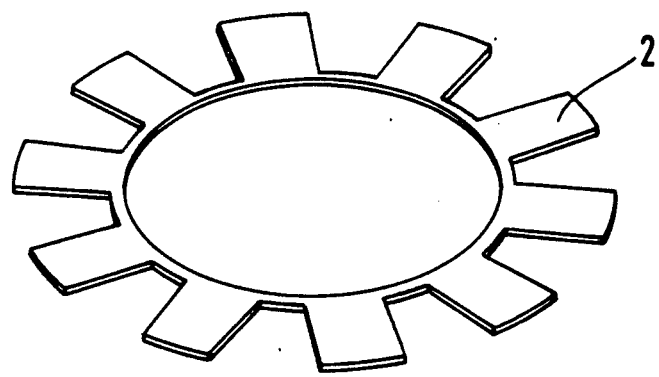
FIG. 2 depicts a segmented ring formed from the foregoing ring.

5% by weight of palatinol ® (=di-2-ethyl hexyl phthalate)

in a drum mill containing Al$_2$O$_3$ balls for 20 hours. The slip is then evacuated in order to remove entrained air. The slip is warped to produce film on a steel strip by the doctor blade process. The slip is added via a casting shoe, the film casting thickness being adjusted to 0.8-1.0 mm by means of the variable slit on the casting shoe. After traversing a drying path, the film is then peeled off the steel strip and cut into cards measuring 180 mm×180 mm. Rings (1) having an outside diameter of 159 mm and an inside diameter of 100 mm are punched from these cards (see FIG. 1). From some of these rings, 10 ring segments per ring are then additionally punched out so that an internal continuous ring having a ring thickness of 3 mm is left (segmented ring (2); see FIG. 2). After applying a laminating paste (laminating aid) 5 of these segmented rings (2) are now stacked on top of each other so that the individual ring segments rest on top of each other in each case. A paste of the following composition is used as laminating aid:

90% by weight of SiC (particle size range 1-60 μm) and

10% by weight of graphite (specific surface: 15-25 m$^2$/g)

100% by weight of solid ceramic compound is mixed with (the following % by weight figures are based on 100% by weight of solid ceramic compound)

50% by weight of unsaturated alcohol (α-terpiniol ($C_{10}H_{18}O$))

70% by weight of polyvinylbutyral

20% by weight of plasticizer (palatinol).

The paste is printed onto the segmented rings by the screen printing process. The annular disks are then pressed together in a laminating press at a pressure of 1-5 bar between room temperature and 80° C. This segmented ring assembly is covered with an annular individual film (1) which is also laminated on.

Figure 3:
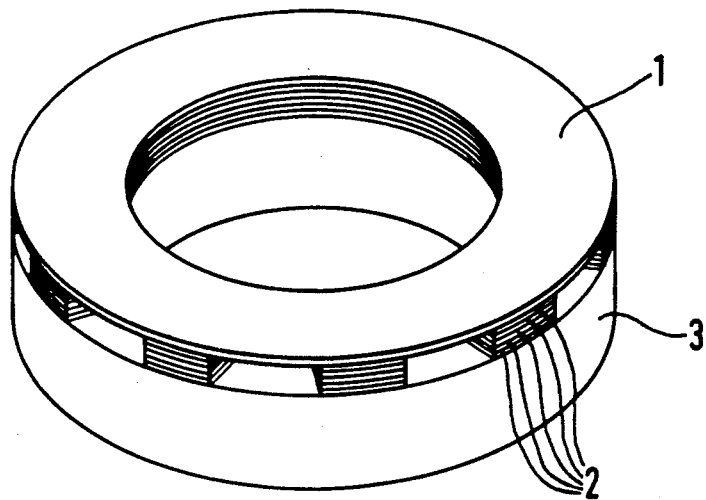
FIG. 3 depicts a finished sliding body according to the invention.

To produce the solid parent body, the film cuttings which have been produced in punching out the rings and segments, are comminuted in a beater mill and screened to 40-400 μm. The resultant powder has the following particle size distribution:
between 400 and 315 μm 1.06% by weight
between 315 and 250 μm 1.31% by weight
between 250 and 200 μm 1.67% by weight
between 200 and 100 μm 0.97% by weight
between 100 and 80 μm 17.67% by weight
between 80 and 63 μm 26.97% by weight
between 63 and 50 μm 33.16% by weight
between 50 and 40 μm 10.81% by weight
between 40 and 20 μm 3.13% by weight
between 20 and 1 μm 3.25% by weight
This powder is then pressed in a dry press at a pressure of 1500 bar to form a solid ring (3) (see FIG. 3) having the following dimensions:
Inside diameter 100 mm
Outside diameter 159 mm
Thickness 24.5 mm The film ring described above is laminated onto this solid ring, the procedure described above being adopted (applying the laminating paste, laminating the ring assembly together in a laminating press at 1-5 bar). In this process, the green body acquires the shape shown in FIG. 3.

Subsequently, the green body is first baked out at approx. 180° C., in which process a portion of the organic constituents volatilizes. The outside diameter of the "semi-green body" so obtained is turned with diamond tools. Then the second baking step is carried out at a temperature of 180°-300° C., followed by the siliconizing at 1600° C., in which process secondary SiC forms from the carbon present in the body and the open pores are filled with silicon. The result of this process is a homogeneous, single-piece slip ring which is notable for a uniform strength. Depending on the use, the slip ring is then additionally ground, lapped and/or polished.

We claim:

1. A process for producing a ceramic sliding body containing hollow chambers, in which process a green film body formed from a ceramic green material comprising ceramic and organic constituents and containing hollow chambers is applied to a green solid annular parent body also formed from a ceramic green material comprising ceramic and organic constituents to form a green body, said organic constituents are removed from said green body so obtained by heating or are carbonized, and said green body is then fired or siliconized, which process comprises the step of producing said green solid annular parent body from film residues which are produced in producing said green film body containing hollow members and subsequently comminuted in a mill to a material having a pulverulent consistency by pressing or dry pressing said pulverulent material.

2. A process as claimed in claim 1, wherein said green film body containing hollow chambers is laminated together with said green solid annular parent body.

3. A process as claimed in claim 2, wherein said green film body is first built up from individual films and subsequently said green film body is laminated onto said green solid annular parent body.

4. A process as claimed in claim 1, wherein a plurality of cards, at least a portion of which contain holes, are punched out of a film formed from said ceramic green material, and said cards are laminated together in sequence with said green solid annular parent body, with the result that a green film body containing hollow chambers joined to said green solid annular parent body is produced.

5. A process as claimed in claim 1, wherein said organic constituents of said green solid annular parent body are identical to those of said green film body chemically and in terms of quantities.

6. A process as claimed in claim 1, wherein the particle sizes of the ceramic green materials used to form said green solid annular parent body and said green film body are identical.

7. A process as claimed in claim 1, wherein said green solid annular parent body is produced from said pulverulent film residues by application of ram pressure of 150-200 MPa.

8. A process as claimed in claim 1, wherein said film residues are comminuted to a pulverulent material having particle sizes of 40-400 μm.

9. A process for producing a ceramic sliding body containing hollow chambers which comprises the steps of:
(a) providing a ceramic green material comprising ceramic and organic constituents,
(b) producing a green film body containing hollow chambers from said ceramic green material,
(c) producing a green solid parent body from film residues which are produced during production of said green film body in step (b) and subsequently comminuted in a mill to a material having a pulverulent consistency by pressing or dry pressing said pulverulent material,
(d) applying said green film body to said green solid parent body to form a green body,
(e) carbonizing or removing by heating said organic constituents from said green body, and
(f) firing or siliconizing said green body.

10. A process as claimed in claim 9, wherein step (b) comprises punching out of a film formed from said ceramic green material a plurality of cards, at least a portion of which contain holes, and step (d) comprises laminating said cards together in sequence with said green solid parent body.

11. A process as claimed in claim 9, wherein the organic constituents of said green solid parent body produced in step (c) are identical to those of said green film body produced in step (b) chemically and in terms of quantities.

12. A process as claimed in claim 9, wherein the particle sizes of the ceramic green materials of said green solid parent body and of said green film body are identical.

13. A process as claimed in claim 9, wherein said green film body is laminated together with said green solid parent body.

14. A process as claimed in claim 13, wherein step (b) comprises building up said green film body from individual films formed from said ceramic green material.

15. A process as claimed in claim 9, wherein said film residues are comminuted to pulverulent material having particle sizes of 40-400 μm.

16. A process as claimed in claim 15, wherein said green solid parent body is produced from said pulverulent film residues by application of ram pressure of 150-200 MPa.

* * * * *